United States Patent [19]

Mertwoy et al.

[11] 4,011,095
[45] Mar. 8, 1977

[54] VISCOSITY STABILIZED SOLUTION OF ETHYL CELLULOSE

[75] Inventors: Abraham Mertwoy, Dresher; Henry Gisser, Philadelphia, both of Pa.

[73] Assignee: The United States of America as represented by the Secretary of the Army, Washington, D.C.

[22] Filed: Mar. 31, 1975

[21] Appl. No.: 563,767

[52] U.S. Cl. .............................. 106/183; 106/198
[51] Int. Cl.$^2$ .................................. C08L 1/26
[58] Field of Search ............. 106/183, 197 R, 185, 106/178, 198

[56] References Cited

UNITED STATES PATENTS

| | | | |
|---|---|---|---|
| 1,987,570 | 1/1935 | Brunson | 106/185 |
| 2,352,173 | 6/1944 | Auer | 106/183 |
| 2,814,618 | 11/1957 | Sloan | 106/197 R |

Primary Examiner—Theodore Morris
Attorney, Agent, or Firm—Nathan Edelberg; Robert P. Gibson; Kalman Pollen

[57] ABSTRACT

Heating a solution of ethyl cellulose in n-butyl acetate and ethyl lactate at about 80°–110° C for at least one hour provides a viscosity stabilized solution useful as a deterrent coating for propellant actuated devices.

3 Claims, No Drawings

VISCOSITY STABILIZED SOLUTION OF ETHYL CELLULOSE

The invention described herein may be manufactured, used and licensed by or for the Government for governmental purposes without the payment to us of any royalty thereon.

This invention relates to a viscosity stabilized ethyl cellulose solution and more particularly concerns such a solution for use as deterrent coatings in propellant actuated devices.

Ethyl cellulose has been used extensively as a deterrent coating to control the burning rate of propellants for propellant actuated devices such, for example, pilot ejection seats. In preparing these deterrent coatings, a propellant strip is normally dipped into an ethyl cellulose solution and withdrawn therefrom at a fixed rate. A major difficulty with this process has been a nonuniformity in the thickness of the deterrent coating resulting in a variability in the burning rate of the propellant strip. These difficulties were caused by an unstable viscosity of the deterrent coating solution resulting in unreliable propellant strips. In pilot ejection devices, too rapid a propellant burning rate may cause the pilot to be hurled against the canopy of the airplane before the canopy has opened, whereas a retarded burning rate may produce no ejection at all.

It was generally believed that a variable viscosity of the ethyl cellulose solution caused the variability in deterrent coating thickness and resultant propellant burning rate. Efforts, over the past 15 years including heating the ethyl cellulose solution at 32° C, bubbling air therethrough, and agitating, failed to provide consistently reproducible results.

It is thus an object of this invention to provide a solution of ethyl cellulose of stabilized viscosity for use with propellant strips of propellant actuated devices.

It is a further object to control the burning rate of propellant strips for use with propellant actuated devices by providing improved deterrent solutions and coatings therefor.

These and further objects will be readily apparent from the following description.

In accordance with the present invention, a solution of ethyl cellulose in n-butyl acetate and ethyl dl-lactate is heated to about 80–110° C for at least one hour to provide a viscosity stabilized solution. Typically, the ratio n-butyl acetate to ethyl dl-lactate will be about 2:1, however, this ratio may vary considerably. At about 60° C the ethyl cellulose will begin to pass into solution. 80° C is the approximate lower temperature limit to insure viscosity stability. It is believed that at 80–110° C, solvation takes place at a rate sufficient to yield a viscosity stabilized solution. Our process has been demonstrated to be effective at a temperature as high as 110° C. Heating should be maintained at 80°–110° C for at least one hour. Less than one hour's heating may produce inadequate solvation of the ethyl cellulose. It should be borne in mind that the solution to be heated need not be freshly prepared.

Since implementation of our process at least 1600 deterrent coated propellant strips have been produced without a single rejection, i.e. the burning rate of samples of manufacturing lots of propellant strips were all within acceptable limits.

This invention may be better understood by reference to the following example.

Example I

Into a 1,000 ml flask equipped with a reflux condenser is added 315 grams of n-butyl acetate (b.P. 124° C–126° C) and 160 grams of ethyl dl-lactate (b.p. 150° C–152° C). To this solution is added 25 grams of ethyl cellulose (70 cp). The resulting solution is heated while stirring to 100° C. (AT 60° C it was noted that ethyl cellulose passed into solution.) The temperature is maintained at 100° C for two hours while stirring. The heated solution is then allowed to cool to room temperature with continued stirring.

We claim:

1. Process for forming a viscosity stabilized solution of ethyl cellulose in n-butyl acetate and ethyl lactate for use with propellant strips of propellant actuated devices, said ethyl cellulose having a viscosity of 70 centipoise before its addition to said n-butyl acetate and said ethyl lactate, comprising
   heating a solution of said ethyl cellulose in said n-butyl acetate and said ethyl lactate at about 80°–110° C for at least one hour.

2. Process according to claim 1 wherein said heating is conducted at about 100° C.

3. Process according to claim 2 wherein said heating at about 100° C is maintained for about 2 hours.

* * * * *